F. STREICH.
DOUGH MOLDING MACHINE.
APPLICATION FILED OCT. 19, 1909.
978,233.
Patented Dec. 13, 1910.
3 SHEETS—SHEET 1.
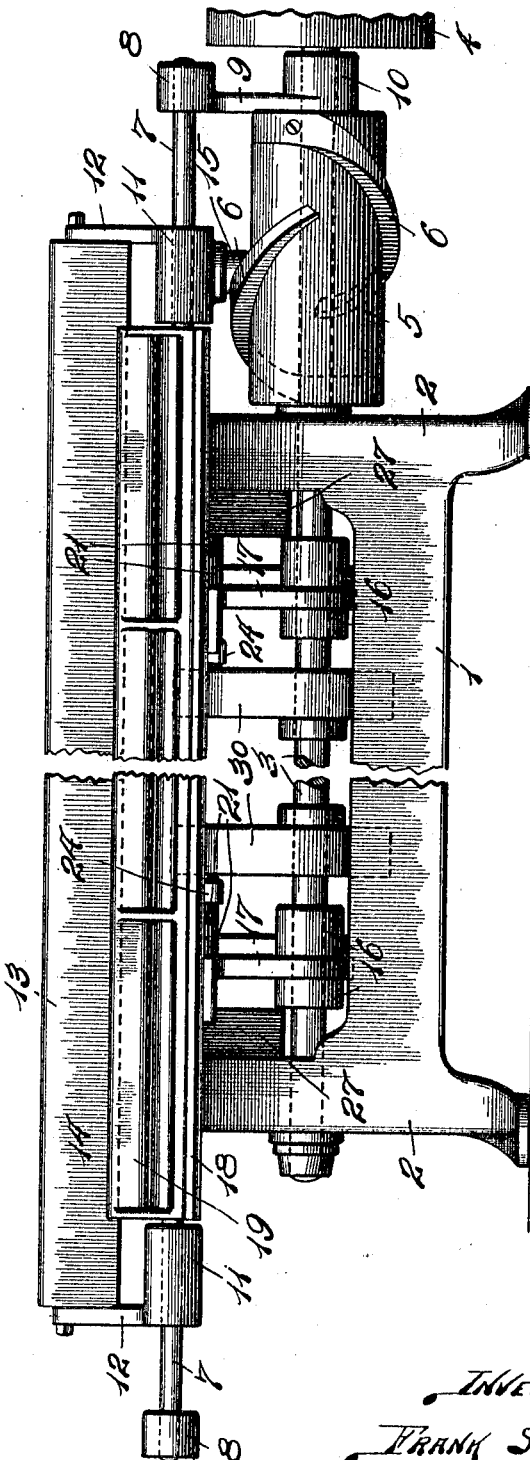
WITNESSES:
E. W. Harrington.
M. P. Smith.
INVENTOR.
FRANK STREICH.
BY F. R. Cornwall
ATTY.

F. STREICH.
DOUGH MOLDING MACHINE.
APPLICATION FILED OCT. 19, 1909.
978,233.
Patented Dec. 13, 1910.
3 SHEETS—SHEET 2.
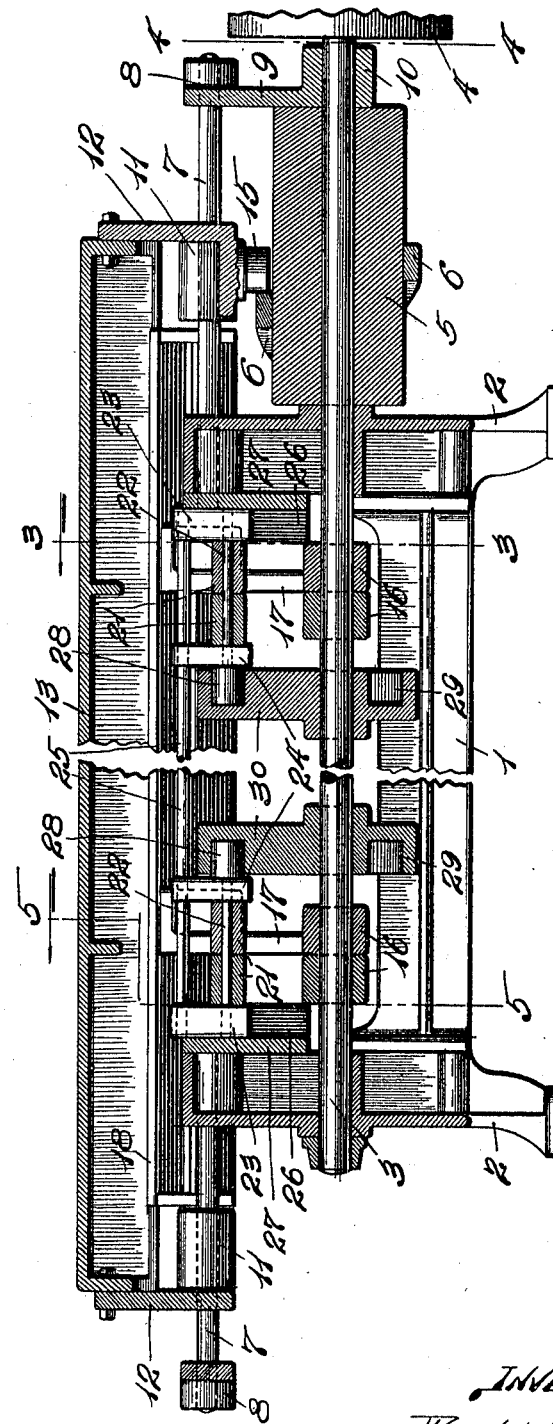
WITNESSES
F. W. Harrington.
M. P. Smith
INVENTOR.
Frank Streich.
By F. R. Cornwall
Atty.
THE NORRIS PETERS CO., WASHINGTON, D. C.

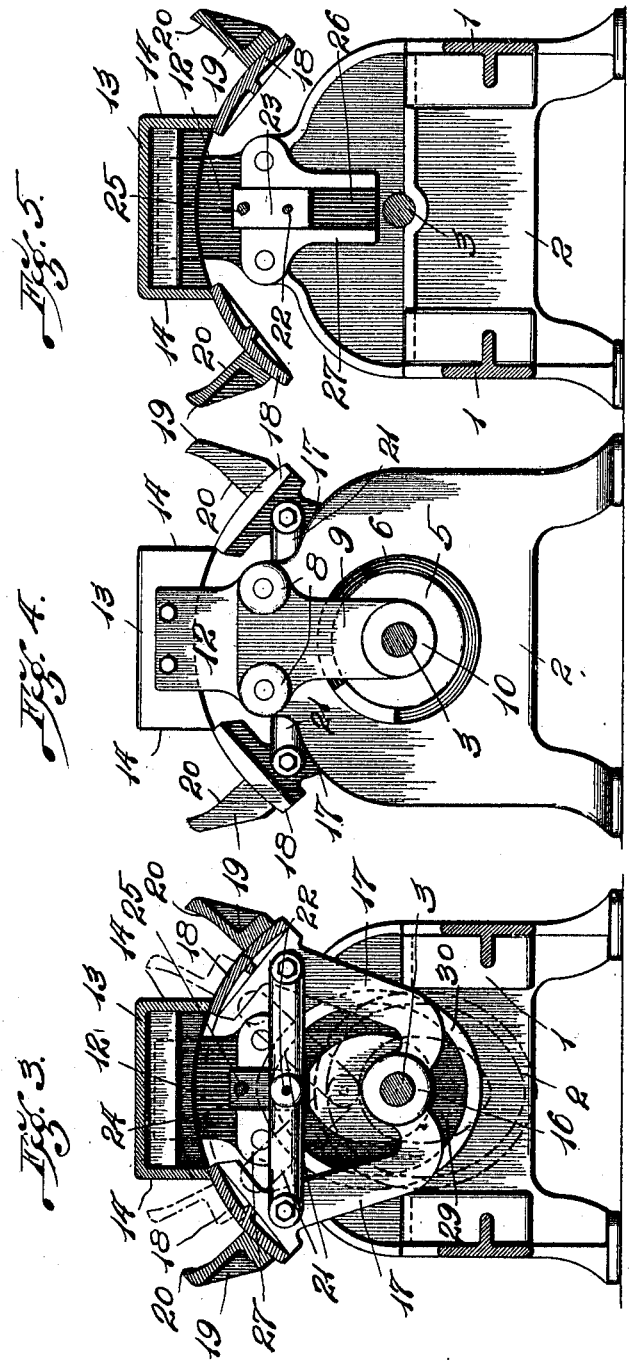

UNITED STATES PATENT OFFICE.

FRANK STREICH, OF ST. LOUIS, MISSOURI, ASSIGNOR TO AMERICAN BAKER'S MACHINERY COMPANY, OF ST. LOUIS, MISSOURI, A CORPORATION OF MISSOURI.

DOUGH-MOLDING MACHINE.

978,233.  Specification of Letters Patent.  Patented Dec. 13, 1910.

Application filed October 19, 1909. Serial No. 523,483.

*To all whom it may concern:*

Be it known that I, FRANK STREICH, a citizen of the United States, residing at St. Louis, Missouri, have invented a certain new and useful Improvement in Dough-Molding Machines, of which the following is a full, clear, and exact description, such as will enable others skilled in the art to which it appertains to make and use the same, reference being had to the accompanying drawings, forming part of this specification, in which—

Figure 1 is a side elevation of a dough molding machine of my improved construction. Fig. 2 is a vertical section taken lengthwise through the center of my improved machine. Fig. 3 is a transverse section taken on line 3—3 of Fig. 2. Fig. 4 is a section taken on the line 4—4 of Fig. 2. Fig. 5 is a transverse section taken on the line 5—5 of Fig. 2.

This invention relates to new and useful improvements in machines for molding or kneading lumps of dough, and is designed as an improvement on similar machines such as are shown and described in an application for United States Letters Patent filed by me January 22, 1909, Serial Number 473,768, and an application filed June 21, 1909, Serial Number 503,409.

In machines of a character to which my invention pertains, the lumps of dough are delivered to the machine and are automatically fed therethrough by the action of the movable dough boards, and said dough boards engage and knead the dough after the manner of manual manipulation, the skin on the top and sides of the lump being stretched and drawn to substantially a point at the bottom of the lump. The kneading of the lumps of dough as they pass through the machine prevents the formation of large gas bubbles in the center of the loaf, and by subjecting the lump to uniform treatment throughout simultaneously with the skin stretching operation, the texture of the loaf is uniform.

The essential features of my improved invention reside in simple means which can be operated with little power for shifting the molding boards in proper time relation to one another, and means for bringing the laterally moving molding boards simultaneously toward the reciprocating molding board, thus equalizing the pressure applied to the lumps of dough between said molding boards.

Referring by numerals to the accompanying drawings 1 designates the base or body of the machine which comprises a pair of end frames 2 and journaled in suitable bearings of said frames is a shaft 3, one end of which projects beyond the body of the machine. Fixed on the projecting end of the shaft 3 is a pulley 4, which is adapted to receive a belt for driving said shaft and the operating parts of the machine. Carried by the shaft 3, between the pulley 4 and the body of the machine is a drum 5, on the surface of which is a pair of oppositely arranged spirally disposed ribs 6. Seated in the upper portion of each end frame 2 is a pair of outwardly projecting rods 7, and uniting the outer ends of each pair of rods is a cross piece 8. The cross piece 8, which unites the pair of rods above the drum 5, is supported by a post 9 provided on its lower end with a bearing 10 through which the shaft 3 passes.

Arranged to slide freely upon the pair of rods 7 are blocks 11, and fixed thereto and projecting upward therefrom are standards 12, which latter are fixed to and support the longitudinally disposed reciprocating molding board 13, the same being provided with vertically disposed dough engaging faces 14. If desired these dough engaging faces 14 may be slightly roughened, or in some instances they may be covered with cloth or other fabric. Carried by the under side of the pair of blocks 11 which are arranged above the drum 5, is a roller 15 which is engaged by a corresponding pair of the side faces of the ribs 6, as shaft 3 is rotated, and as a result of such engagement a reciprocating motion will be imparted to the molding board 13.

Loosely journaled on the shaft 3 inside the end frames 2, are the hubs 16 of arm 17, which projects outwardly and upwardly from said shaft 3, and carried by the upper ends of said arms, are the laterally swinging molding boards 18, the top surfaces of which travel in a path immediately below the faces 14 of the molding board 13, said path being concentric with the center of the shaft 3. Carried by each of the molding boards 18 and projecting upwardly and outwardly therefrom, is a plate 19, the inner faces 20 of which are preferably slightly concave and adapted to engage the lumps of dough and press the same against the corresponding faces 14 of the molding board 13 when the molding boards 18 are swung upward and inward beneath said molding board 13.

Pivotally connected to the upper portions of each corresponding pair of arms 17, are the outer ends of arms 21, arranged in pairs, and passing through the inner ends of each pair of these arms is a rod 22. Each rod 22 passes through a pair of blocks 23 and 24, and passing through the upper ends of all of the blocks 23 and 24 is a rod 25 which is for the purpose of uniting all of said blocks and causing the same to move uniformly. The blocks 23 which are immediately adjacent the end frames 2, occupy and are arranged to slide in vertically disposed grooves 26 formed in blocks 27, which latter are fixed in any suitable manner to the inner faces of the end frames 2. Journaled on the inner ends of the rods 22 and just outside the blocks 24, are rollers 28 which travel in eccentric grooves 29 formed in the outer faces of a pair of cam disks 30 which latter are fixed upon the shaft 3.

The operation of my improved dough molding machine is as follows: The lumps of dough of proper weight are delivered in any suitable manner to the molding boards or tables 18 between the plates 19, and the side faces 14 of the molding board 13. The shaft 3 is driven by the application of a belt to the pulley 4, and as said shaft rotates, the molding board 13 will be longitudinally reciprocated owing to the engagement of the spirally disposed ribs 6 against the roller 15 which is connected to said molding board 13. At the same time the cam disks 30 will revolve, and as a result the rollers 28 traveling in the eccentric grooves 29, will cause the rods 22, blocks 23 and 24, rod 25 and the inner ends of the arms 21 to move vertically. As this action takes place the outer ends of the arms 21 which are pivotally connected to the arm 17 will be drawn inward to the positions shown by dotted lines in Fig. 3, thus swinging the molding boards or tables 18 upward and inward beneath the molding board 13, and thus the plates 19 will be brought into juxtaposition with the faces 14 of the molding board 13, thus applying pressure to the lumps of dough at the same time the molding board 13 is moving in one direction, and thus said lumps of dough are simultaneously squeezed and rotated. The space between the faces 14 and the faces of the plates 19 is wedge shaped as shown by dotted lines during this combined squeezing and rotating action, and as a result the lumps of dough will be shaped similar to an inverted cone. As the combined pressure and rolling action takes place, the skin on the surface of each lump of dough will be drawn downward toward the lower end of said lump, thus accomplishing the desired result. The plates 19 move upward and inward toward the side faces 14 of the molding board during the time said molding board is moving in one direction, and during the time said molding board moves in the reverse direction the actuating parts for the molding boards 18 and 19, cause the same to move outward and downward away from the molding board 13, and as a result of these operations the lumps of dough are intermittently engaged, and correspondingly move from one end of the machine to the other, and as they discharge from said machine, they are in condition to be placed into pans or the oven.

It will be readily understood that various forms of devices besides the one shown can be utilized for reciprocating the molding board 13, it only being essential that suitable mechanism is provided for simultaneously imparting reciprocating movement to said molding board, and swinging movement to the molding board or tables 18 and the plates carried thereby.

The inner faces of the plates 19 are preferably made slightly concave in order to prevent the lumps of dough from lifting or moving upward when they are engaged and pressed against the reciprocating molding board.

A dough molding machine of my improved construction is comparatively simple, can be operated with the expenditure of little power, and very rapidly and efficiently performs the required work.

I am aware that minor changes in the construction and arrangement of the several parts of my machine may be made and substituted for those herein shown and described without departing from the spirit of my invention.

I claim:

1. In a machine of the class described, a reciprocating molding board, a pair of molding boards arranged to swing beneath the reciprocating molding board, and moving laterally with respect thereto the top surfaces of which molding boards are convex, dough engaging members carried by said swinging molding boards, the dough engaging faces of which members are concave in cross section, a driven shaft, and means fixed on said shaft and engaging parts carried by the molding boards for imparting motion thereto.

2. In a machine of the class described, a reciprocating molding board, a molding board arranged to swing laterally beneath the reciprocating molding board, a dough engaging member carried by the laterally moving board, and the dough engaging face of which member is concave.

3. In a machine of the class described a reciprocating molding board, a molding board arranged to swing laterally beneath said reciprocating molding board, the top surface of which laterally moving molding board is convex, a dough engaging member carried by the laterally moving molding board, and the face of which dough engaging member is concave.

4. In a machine of the class described, a frame, a molding board arranged for reciprocation thereon, a pair of molding boards arranged to swing in the frame beneath the reciprocating molding board, and to move laterally with respect thereto, the top surfaces of which molding boards are convex, dough engaging members on the swinging molding boards the dough engaging faces of which boards are concave in cross section, the inner faces of which dough-engaging members are smooth and concave in cross section throughout their length, a shaft journaled in the frame there being a connection between said shaft and the reciprocating mold board, whereby the same is reciprocated as said shaft is rotated, and means on the shaft and operated thereby for imparting swinging movement to the laterally moving molding boards.

5. In a machine of the class described, a frame, a molding board arranged for reciprocation thereon, a pair of molding boards arranged to swing in the frame beneath the reciprocating molding board, and to move laterally with respect thereto, a shaft journaled in the frame, disks fixed on said shaft, in which disks are formed cam grooves, links connected to the laterally moving molding boards, and rollers carried by said links, which rollers operate in the cam grooves.

6. In a machine of the class described, a reciprocating molding board, a rotatable shaft beneath said molding board, means on said shaft for imparting reciprocating movement to the molding board, pairs of arms journaled on the shaft, and projecting upwardly therefrom molding boards fixed on the upper ends of said arms and adapted to swing beneath the reciprocating molding board, and molding boards carried by the swinging molding boards and provided with concave dough engaging faces.

7. In a machine of the class described, a reciprocating molding board, a rotatable shaft journaled beneath said molding board, means on said shaft for imparting reciprocatory movement to the molding board, arms journaled on the shaft and projecting upwardly therefrom, molding boards carried by said arms and adapted to swing beneath the reciprocating molding board, the top faces of which swinging molding boards are convex in cross section, means actuated by the shaft for imparting movement to the arms and the molding boards, carried thereby and molding boards carried by the laterally swinging molding boards, and provided with concave dough engaging faces.

8. In a machine of the class described, a reciprocating molding board, a pair of molding boards arranged to swing beneath the reciprocating molding board and moving laterally with respect thereto, dough-engaging members carried by said swinging molding boards, a driven shaft, a drum thereon, a pair of spirally disposed ribs on the drum, and a roller carried by the reciprocating molding board, which roller is engaged by the spirally disposed ribs.

9. In a machine of the class described, a reciprocating molding board, a pair of molding boards arranged to swing beneath the reciprocating molding board and moving laterally with respect thereto, dough-engaging members carried by said swinging molding boards, a driven shaft, arms journaled thereto, which arms are pivotally connected to the laterally moving molding boards, links connecting the arms, rollers carried by said links, and disks fixed on the driven shaft, in which disks are formed cam grooves in which the rollers carried by the links engage.

10. In a machine of the class described, a reciprocating molding board, a pair of molding boards arranged to swing beneath the reciprocating molding board and moving laterally with respect thereto, dough-engaging members carried by said swinging molding boards, a driven shaft, arms journaled thereto, which arms are pivotally connected to the laterally moving molding boards, links connecting the arms, rollers carried by said links, disks fixed on the driven shaft, in which disks are formed cam grooves in which the rollers carried by the links engage, a drum carried by said shaft, a pair of spirally disposed ribs on said drum, and which ribs engage a portion of the reciprocating molding board for imparting movement thereto.

In testimony whereof I hereunto affix my signature in the presence of two witnesses, this 16th day of October, 1909.

FRANK STREICH.

Witnesses:
MARTIN P. SMITH,
L. A. CORRAO.